No. 827,415. PATENTED JULY 31, 1906.
H. W. BROWDER.
HOTEL OFFICE DINKEY.
APPLICATION FILED JULY 3, 1905.
2 SHEETS—SHEET 1.
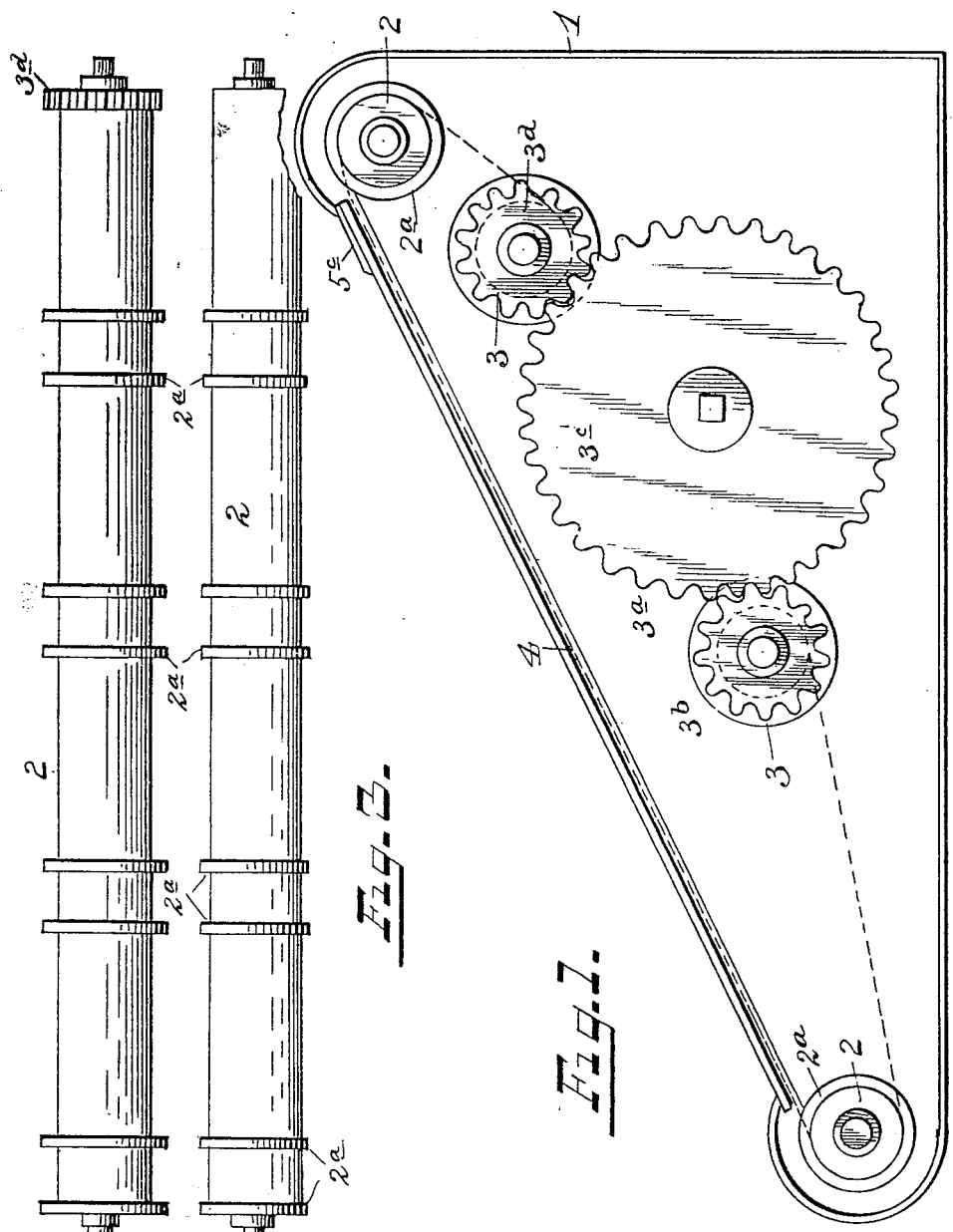
Inventor:
H. W. Browder, No. 827,415. PATENTED JULY 31, 1906.
H. W. BROWDER.
HOTEL OFFICE DINKEY.
APPLICATION FILED JULY 3, 1905.

2 SHEETS—SHEET 2.

UNITED STATES PATENT OFFICE.

HENRY WORDEN BROWDER, OF BEAUMONT, TEXAS.

HOTEL-OFFICE DINKEY.

No. 827,415.          Specification of Letters Patent.          Patented July 31, 1906.

Application filed July 3, 1905. Serial No. 268,166.

*To all whom it may concern:*

Be it known that I, HENRY WORDEN BROWDER, a citizen of the United States, residing at Beaumont, in the county of Jefferson and State of Texas, have invented new and useful Improvements in Hotel-Office Dinkeys, of which the following is a specification.

My invention relates to improvements in that class of devices or contrivances for noting or indicating, for instance, the stay of a hotel patron, preferably designated by me as a "hotel-office dinkey."

Said invention has for its object to effect the aforesaid end in a simple, accurate, and expeditious manner; and it consists of structural features substantially as hereinafter fully disclosed, and particularly pointed out by the claim.

In the accompanying drawings, illustrating the preferred embodiment of my invention, Figure 1 is a vertical section produced longitudinally through the machine or invention. Fig. 2 is a plan view thereof. Fig. 3 shows detached views of the movable indicia-tape or strip-bearing rolls.

In the carrying out of my invention I provide a suitable housing or casing 1, within which are arranged or journaled two rolls 2 2 at the ends thereof, respectively, and intermediarily of said rolls are arranged or journaled three additional rolls 3 $3^a$, 3 intergeared, as at $3^b$ $3^c$ $3^d$, for conjoint actuation, to impart to the rolls 3 3 planes of rotation from right to left and from left to right for a purpose apparent later, the driving power being delivered through the roll $3^a$ in any suitable way. Encompassing the rolls 2 2 and connected to the rolls 3 3 are strips or ribbons 4, of suitable material, as wood, linen, paper, or metal, bearing or having inscribed or marked thereon certain indicia $4^a$, the thirty-one days of a month, or the same strung out or produced in duplicate, being printed or indicated thereon, as shown. Said rolls 2 2 are suitably equipped with annular collar-like partitions $2^a$ to guide and properly hold apart said ribbons or strips 4 as movement is imparted thereto via the rolls 3, said ribbons or strips being adapted to be moved thereby in either direction longitudinally, the purpose of which is obvious.

Additional or further strips or pieces of suitable material 5 $5^a$ $5^b$ $5^c$, preferably of the number shown, also bearing or having marked thereon certain indicia, as presently disclosed, are suitably applied and secured within the casing or housing 1 with relation to the movable indicia strips or ribbons 4, as shown, and with the end in view as presently explained. Said additional indicia strips or pieces have marked or printed thereon as captions the words "Breakfast," "Dinner," "Supper," and "Lodging," respectively, preferably directly under which and forming a subdivision for each such caption is drawn a horizontal or right line $5^{aa}$. Also below and a suitable space from said line are produced, preferably, two parallel horizontal lines $5^{bb}$, and drawn through the spaces thus lined off upon said strips or pieces is a number of vertical lines $5^{ab}$, extending from the line $5^{aa}$ clear to the bottom edge of said strips or pieces, dividing up said lined-off spaces into subdivisions $5^x$. In these latter of each such piece or strip are the word "Date" and the capitals or initials "B.," "D.," "S.," and "L.," suggestive of the same words forming the captions of the several said strips or pieces, as will be readily noted. Again, each of said indicia strips or pieces has produced thereon crosswise of the vertical lines $5^{ab}$, all the way down to the bottom thereof, numerous horizontal lines $5^{bc}$, thus dividing up the remaining portion of such strip or piece into sundry lined-off subdivisions $5^{cc}$. In these latter subdivisions are arranged tables of figures or numerals each based upon dividing up a day into quarters—*i. e.,* the gradating of the value or unit of each subdivision by uniform mathematical progression, a quarter-fraction—the initial fraction of each successive top row of subdivisions of said strips being accordingly removed one subdivision to the right, as shown.

It will be noted that the word "Date" of the strips or pieces just referred to will stand in alinement with the respective movable indicia-strips 4, the purpose of which is obvious.

As an illustration or example of the use of my invention it is presumed that a patron of a hotel, for instance, registers on the 2d, beginning with or including breakfast, and departs on the 12th, after supper, it of course being assumed that the initial or movable indicia-strip 4 has been accordingly adjusted or moved during the interim by the hotel proprietor or office attendant thereof, as convenience would suggest, up to the latter-noted date. The length of the stay of such patron will be given by referring to the numeral "2" under the general caption of "Breakfast," the date and meal-time arrival of said patron, and to the figures in vertical alinement with the initial or capital "S." of the same general caption and in horizontal alinement with the same numeral "2," the meal-time of the date of the departure of said patron, said figures being "10¾" and their unit of value being days. Consequently the stay of such patron is that number of days the utility of which is obvious in this connection.

It is also noted that in lieu of producing the headings or captions comprising the words and initials above described and the tables of figures upon continuous strips or pieces the former may be printed or otherwise produced upon separate pieces or strips from those bearing the latter.

It is apparent that other indicia than that hereinbefore described may be employed in connection with a fixed sheet with other headings or captions thereon in connection with the movable indicia-strips and means for actuating the same and the purposes of my invention be carried out.

Latitude is allowed as to details herein, since they may be changed as circumstances suggest without departing from the spirit of my invention.

I claim—

A device of the character described, comprising a number of fixed strips or members having thereon the following captions: "Breakfast," "Dinner," "Supper," and "Lodging," respectively, the following series of initials: "B.," "D.," "S.," and "L." a series thereof being arranged under each of said captions, and columns or tables of figures or units arranged in alinement with each of said captions and initials, and movable continuous or endless strips or members, each bearing the date-numbers suggestive of a calendar month, said columns or tables of figures each, having its unit of value based upon a fraction of one-quarter, accordingly the top or initial rows of said columns reducing from the full or maximum number of units to one less for each successive row, the final top row space containing the minimum or one unit, as herein disclosed.

In testimony whereof I affix my signature in presence of two subscribing witnesses.

HENRY WORDEN BROWDER.

Witnesses
   E. ZAFIN,
   LEWIS S. EASTIN.